US012803367B2

(12) United States Patent
Zhou

(10) Patent No.: US 12,803,367 B2
(45) Date of Patent: Nov. 17, 2026

(54) HOLLOW HUB MOTOR

(71) Applicant: Taizhou Huangyan Bochuang Design Co., Ltd., Taizhou (CN)

(72) Inventor: Diaodiao Zhou, Taizhou (CN)

(73) Assignee: Taizhou Huangyan Bochuang Design Co., Ltd., Taizhou (CN)

( * ) Notice: Subject to any disclaimer, the term of this patent is extended or adjusted under 35 U.S.C. 154(b) by 226 days.

(21) Appl. No.: 18/745,078

(22) Filed: Jun. 17, 2024

(65) Prior Publication Data

US 2025/0385565 A1 Dec. 18, 2025

(51) Int. Cl.

*H02K 5/173* (2006.01)
*B60B 27/00* (2006.01)
*B60K 7/00* (2006.01)
*B60K 11/02* (2006.01)
*F16C 19/18* (2006.01)
*H02K 5/20* (2006.01)
(Continued)

(52) U.S. Cl.

CPC ....... *H02K 5/1735* (2013.01); *B60B 27/0015* (2013.01); *B60K 7/0007* (2013.01); *B60K 11/02* (2013.01); *F16C 19/18* (2013.01); *H02K 5/203* (2021.01); *H02K 7/085* (2013.01); *H02K 7/102* (2013.01); *H02K 9/19* (2013.01); *F16C 2326/02* (2013.01)

(58) Field of Classification Search

CPC ...... H02K 5/1735; H02K 5/203; H02K 7/085; H02K 7/102; H02K 9/19; B60B 27/0015; B60K 7/0007; B60K 11/02; B60K 2007/0038; B60K 2007/0092; F16C 19/18; F16C 2326/02

See application file for complete search history.

(56) References Cited

U.S. PATENT DOCUMENTS 8,061,901 B2 * 11/2011 Hosmer ................ F16C 33/805 384/488
9,586,648 B2 3/2017 Marioni
(Continued)

FOREIGN PATENT DOCUMENTS

CN 102738921 A * 10/2012
WO WO-2014108231 A2 * 7/2014 ........... H02K 5/1735
WO WO-2017122226 A1 * 7/2017 ............. B60K 7/007

OTHER PUBLICATIONS

WO-2014108231-A2_translate (Year: 2014).*
CN-102738921-A_translate (Year: 2012).*

*Primary Examiner* — Tulsidas C Patel
*Assistant Examiner* — Mohammed Ahmed Qureshi
(74) *Attorney, Agent, or Firm* — Westbridge IP LLC

(57) ABSTRACT

A hollow hub motor includes a wheel rim for mounting a tire and a hollow hub cover. A supporting frame is connected to an outer edge of a side wall of the hub cover, the supporting frame is used for connecting the hub motor and a driving subject, a bearing is rotatably connected between the hub cover and the wheel rim, the bearing comprises an inner ring matched with the hub cover. The wheel rim and the hub cover are matched to form an accommodating cavity, a stator and a rotor are arranged in the accommodating cavity, a sealing cover plate is arranged between the bearing and the side wall of the hub cover, a sealing member is fixedly connected to the sealing cover plate, and the sealing member is sleeved on a supporting portion and tightly attached to the supporting portion.

18 Claims, 8 Drawing Sheets

(51) Int. Cl.

| | |
|---|---|
| ***H02K 7/08*** | (2006.01) |
| ***H02K 7/102*** | (2006.01) |
| ***H02K 9/19*** | (2006.01) |

(56) References Cited

U.S. PATENT DOCUMENTS

| | | | | |
|---|---|---|---|---|
| 9,789,929 | B2 | 10/2017 | Wu | |
| 10,752,319 | B2 | 8/2020 | Kim et al. | |
| 11,014,627 | B2 | 5/2021 | Hawkins | |
| 11,260,936 | B2 | 3/2022 | Calley et al. | |
| 11,352,097 | B2 | 6/2022 | Keppens | |
| 11,383,789 | B2 | 7/2022 | Menichetti | |
| 11,459,060 | B2 | 10/2022 | Gong | |
| 11,901,796 | B2 | 2/2024 | Huang | |
| 2011/0303471 | A1 * | 12/2011 | Urabe | B60L 50/20 180/65.51 |
| 2015/0266542 | A1 | 9/2015 | Marioni | |
| 2019/0112002 | A1 | 4/2019 | Kim et al. | |

* cited by examiner

HOLLOW HUB MOTOR

TECHNICAL FIELD

The present application belongs to the technical field of hub motors, and particularly relates to a hollow hub motor.

BACKGROUND

Hub motor refers to a motor that integrates a power system, a transmission system and a braking system together and arranges the integrated systems in a hub. The hub motor can save a lot of transmission parts, save a layout space, reduce structural complexity, improve transmission efficiency, realize a variety of complex driving modes, and facilitate control, thus being widely used in electric vehicles, new energy vehicles, robots and other fields.

However, there are still some problems in the practical application of existing hub motor, for example, the hub motor has shortcomings in heat dissipation and structural stability. Specifically, on one hand, when the hub motor is in a working state, a temperature rises, and when a temperature of a permanent magnet in the hub motor rises to a preset threshold, demagnetization will occur, and in severe cases, an enameled wire will be burned, which will affect a working performance of the hub motor. Moreover, the higher the power of the hub motor, the higher the working temperature, and the worse the heat dissipation performance, so that there should be a compromise between the power and the temperature when the hub motor is designed.

On the other hand, the existing hub motor is mounted on a frame structure through a central shaft passing through the bearing and a U-shaped fork of the hub motor, and fixed by locking nuts at two ends of the central shaft. Such structural design has the problem of stress concentration, and is difficult to effectively disperse a stress of the U-shaped fork and the frame structure, which is easy to cause the breakage of a side cover of the hub motor during the assembly or disassembly of the hub motor. The central shaft is easy to wear during the long-term working of the hub motor. Moreover, the existing hub motor is sealed by a TC oil seal, the TC oil seal is a double-lip oil seal completely covered by rubber and provided with a self-tightening spring, and after the central shaft is worn, water is easy to enter the bearing of the hub motor, and then enters the interior of the hub motor.

Therefore, an optimized hub motor structure design scheme is needed to improve a comprehensive performance of the hub motor.

SUMMARY

The present application is intended to provide a hollow hub motor aiming at the above problems in the prior art, and the technical problem to be solved by the present application is how to reduce a weight during normal running.

The object of the present application is achieved by the following technical solution: a hollow hub motor comprises a wheel rim for mounting a tire and a hollow hub cover, a supporting frame is connected to an outer edge of a side wall of the hub cover, the supporting frame is used for connecting the hub motor and a driving subject, a bearing is rotatably connected between the hub cover) and the wheel rim, and the bearing comprises an inner ring matched with the hub cover, wherein the wheel rim and the hub cover are matched to form an accommodating cavity, a stator and a rotor are oppositely arranged in the accommodating cavity, the stator is fixed on the hub cover), a sealing cover plate is arranged between the bearing and the side wall of the hub cover, a sealing member is fixedly connected to the sealing cover plate, the sealing member is sleeved on a supporting portion and tightly attached to the supporting portion, and the sealing cover plate is arranged on one side of the bearing, so that the stator and the rotor are isolated from the outside.

On the basis that the original hub motor fixes the rotor on the wheel rim, the hollow hub cover is arranged on the inner side of the wheel rim, the supporting frame connected with a driven subject is mounted on the outer edge of the side wall of the hub cover, which is a position on the outer side of the hub cover close to the wheel rim, and the hub cover and the wheel rim are rotatably connected through the bearing, so that the hub cover and the wheel rim are matched to form the accommodating cavity, and a relative position of the rotor and the stator in the accommodating cavity is ensured, thus avoiding a failure caused by left-right deviation; and one side of the bearing is covered with the sealing cover plate, and the sealing member on the sealing cover plate is tightly attached to the supporting portion on the inner ring to avoid impurities or rainwater from entering the accommodating cavity through the sealing cover plate and the bearing, the hub cover is hollow, and the stator is fixed on the hub cover, so that a heat dissipation area of the stator is increased, and a weight of the hub motor is reduced by the hollow design while ensuring the normal use of the hub motor, thus improving driving experience.

In the hollow hub motor above, a section of the sealing cover plate is L-shaped or C-shaped, a pressurizing circular ring is sleeved on the sealing member, and the sealing member is tightly attached to the supporting portion through the pressurizing circular ring. The sealing cover plate is set to be L-shaped or C-shaped, so that a contact area between the sealing member at the bottom and the supporting portion is increased, and the sealing member is tightly attached to the supporting portion by the pressurizing circular ring, so that a sealing effect is further improved.

In the hollow hub motor above, the bearing further comprises an outer ring and a rolling member, the outer ring is matched with an inner side of the wheel rim, the rolling member is sandwiched between the outer ring and the inner ring, and the sealing cover plate covers one sides of the outer ring and the rolling member, and is matched with the outer side of the hub cover and the inner side of the wheel rim to form the closed accommodating cavity. The inner ring and the outer ring are rotatably connected by the rolling member, so that a friction between the wheel rim and the hub cover during rotation is reduced, thus prolonging the service life, and the sealing cover plate is arranged on the outer ring and the rolling member, so as to avoid impurities from entering from a gap between the outer ring and the rolling member.

In the hollow hub motor above, an opening of the L-shaped or C-shaped sealing cover plate is oriented to the side wall of the hub cover.

In the hollow hub motor above, a groove is formed in an upper surface of the sealing member, and the pressurizing circular ring is embedded in the groove.

In the hollow hub motor above, the bearing further comprises an outer ring and a rolling member, the outer ring is matched with an inner side of the wheel rim, the rolling member is sandwiched between the outer ring and the inner ring, and the sealing cover plate covers one sides of the outer ring and the rolling member, and is matched with the outer side of the hub cover and the inner side of the wheel rim to form the closed accommodating cavity.

In the hollow hub motor above, a plurality of rolling members are sandwiched between the outer ring and the inner ring, the rolling members are connected through a cage, and the rolling member is made of metal or ceramic.

In the hollow hub motor above, one side of the inner ring is flush with an outer ring, and the other side of the above inner ring extends towards the side wall of the hub cover to form the supporting portion, and the supporting portion is used for mounting the sealing cover plate and attached to the sealing member to realize sealing.

In the hollow hub motor above, two bearings are provided and symmetrically arranged on two sides of the hub cover.

In the hollow hub motor above, a cooling channel is arranged in the hub cover, the stator comprises a winding bracket, and the cooling channel is located right below the winding bracket.

In the hollow hub motor above, a water inlet pipe and a water outlet pipe are also fixed on the hub cover, the water inlet pipe is used for introducing a liquid into the cooling channel for cooling, and the water outlet pipe is used for discharging the liquid after cooling from the cooling channel.

In the hollow hub motor above, the hub cover comprises a left cover body and a right cover body, one sides of the left cover body and the right cover body are respectively provided with a cooling groove, and the two cooling grooves are oppositely arranged and matched to form the cooling channel.

In the hollow hub motor above, a sealing gasket is arranged between the left cover body and the right cover body, the sealing gasket is used for blocking a liquid in the cooling groove, and a plurality of communication holes are arranged in the sealing gasket.

In the hollow hub motor above, the supporting frame comprises two symmetrically arranged V-shaped frames, the left cover body and the right cover body are both provided with two mounting seats, and the two mounting seats are used for fixing one ends of the V-shaped frames.

In the hollow hub motor above, a cushion block is arranged between the hub cover and the V-shaped frame, and the cushion block is used for connecting the V-shaped frame and the hub cover.

In the hollow hub motor above, the water inlet pipe is located on a side wall of one of the mounting seats of the left cover body, and the water outlet pipe is located on a side wall of one of the mounting seats of the right cover body.

In the hollow hub motor above, one side of the wheel rim is provided with a brake ring, a brake caliper is fixed on one of the V-shaped frames, the brake caliper is located between the V-shaped frame and the side wall of the hub cover, and a brake assembly is matched with the brake ring.

In the hollow hub motor above, the rotor comprises a magnetic mounting member and multiple groups of magnetic elements, the magnetic element is arranged on the inner side of the wheel rim through the magnetic mounting member, and the rotor and the stator are oppositely arranged.

In the hollow hub motor above, an embedding groove for mounting the winding bracket is arranged in the hub cover), and the embedding groove is formed by matching the left cover body with the right cover body.

In the hollow hub motor above, a ratio of an inner diameter to an outer diameter of the hollow hub cover is greater than or equal to 30%.

Compared with the prior art, the present application has the following advantages.

Firstly, according to the present application, the hollow hub cover is adopted, which reduces the weight and improves the driving comfort, and the contact area with air is increased by embedding the stator in the hollow hub cover at the same time, which improves heat dissipation efficiency, and moreover, the bearing is arranged between the hub cover and the wheel rim, and the C-shaped sealing cover plate is sleeved on the inner ring of the bearing to form the relatively closed accommodating cavity, so as to avoid a damage caused by the liquid entering the accommodating cavity and making contact with the stator, thus ensuring normal use.

Secondly, the hub cover of the present application comprises the left cover body and the right cover body, the cooling grooves are respectively arranged in the left cover body and the right cover body and matched to form the cooling channel, the liquid enters through the water inlet pipe to cool the stator directly above the cooling channel and is discharged through the water outlet pipe after cooling, and the cooling channel is matched with the hollow hub cover, so as to improve the heat dissipation efficiency.

Lastly, according to the present application, the driven subject is connected with the hub motor through the supporting frame with the V-shaped frames, so as to increase the contact area between the supporting frame and the hub motor, thus improving structural strength.

DETAILED DESCRIPTION OF THE EMBODIMENTS

The following descriptions are specific embodiments of the present application, and with reference to the drawings, technical solutions of the present application are further described, but the present application is not limited to these embodiments.

As shown in FIG. 1 to FIG. 9, a hollow hub motor in an embodiment of the present application is clarified, and a driven subject described herein may be an electric bicycle, an electric motorcycle, a new energy automobile, and other vehicles. In addition, although an example of using the hub motor in vehicles is given above, the hub motor may also be applied to other fields such as robots, which will not be limited in the present application.

More importantly, in an existing hub motor, the longer the working time, the higher the power, the higher the temperature generated during an interaction between a rotor 102 and a stator 201, the worse the heat dissipation performance, and the lower the driving efficiency with the increase of temperature. In addition, in a traditional hub motor, the stator 201 has a large volume and a heavy weight, so the rolling resistance and an unsprung weight are larger and the comfort is lower. In the present application, in order to improve heat dissipation efficiency and reduce a weight of a tire 101, a hub cover 2 is set to be hollow, and a winding bracket 2011 of the stator 201 is sleeved and embedded on the hub cover 2, thus reducing the weight of the tire 101 while increasing a heat dissipation area.

Figure 1:
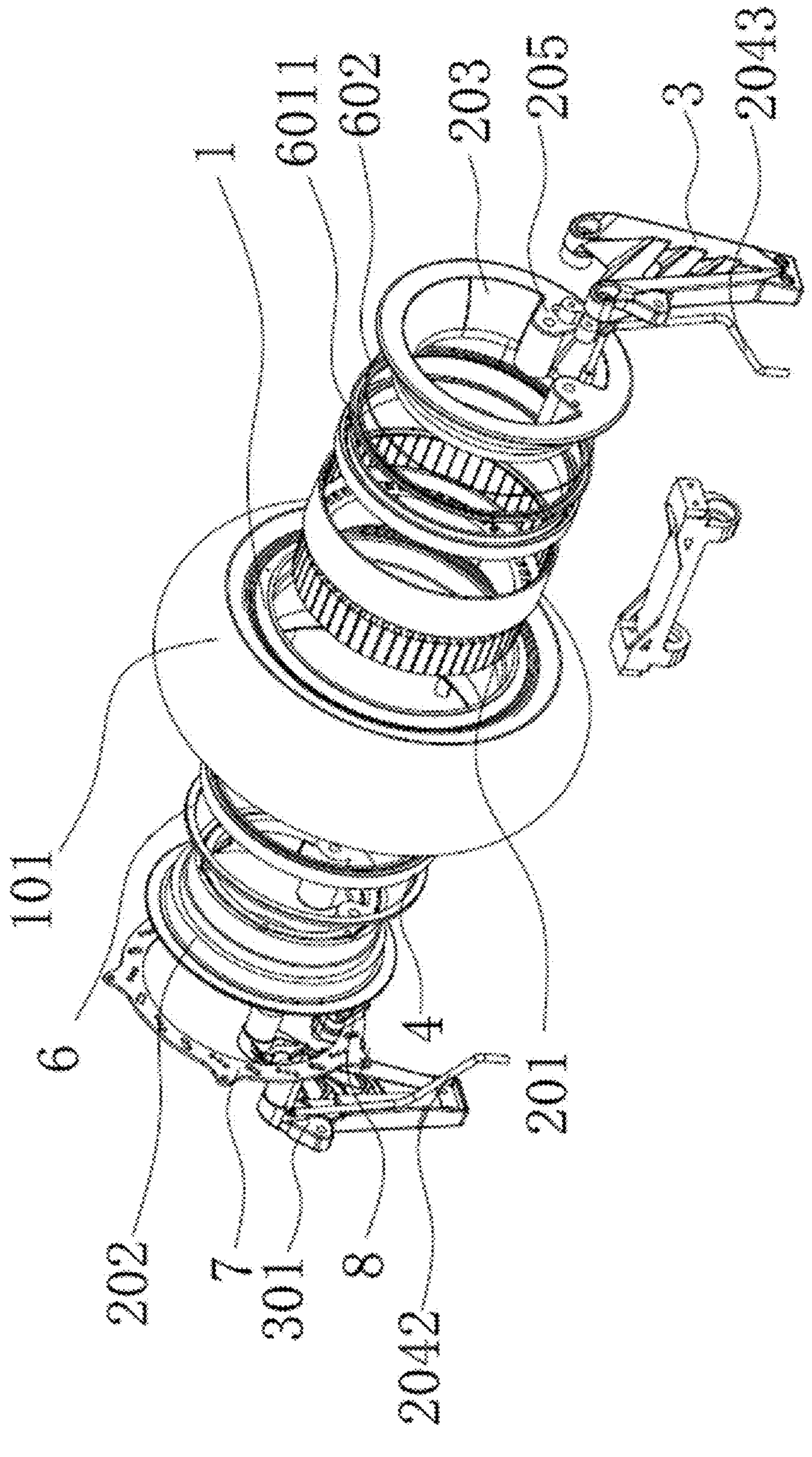
FIG. 1 is an overall exploded view of the present application.
Figure 2:
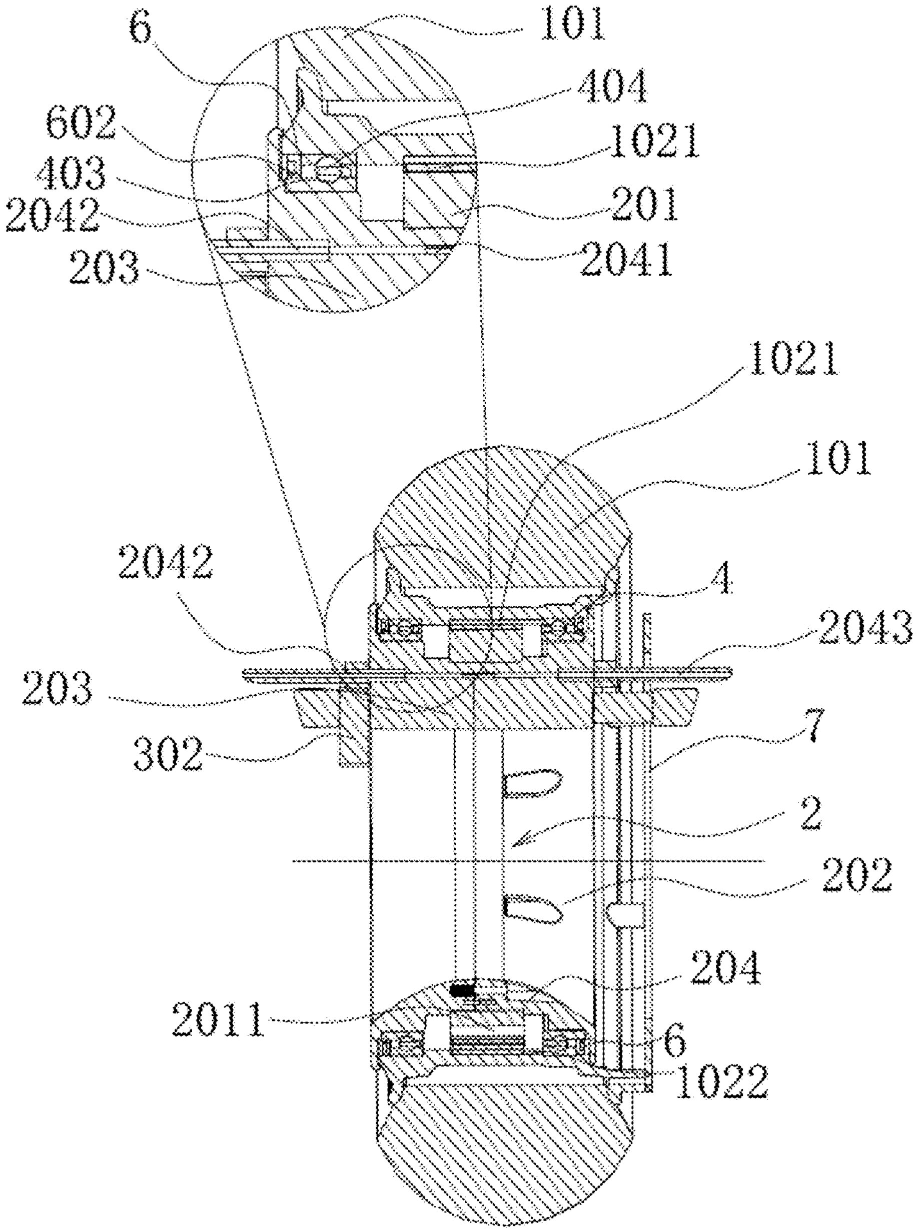
FIG. 2 is an overall sectional view of the present application.

As shown in FIG. 1 and FIG. 2, a hub motor of the present application comprises a V-shaped frame 301, a left cover body 202, a wheel rim 1 and a right cover body 203 which are sequentially arranged from left to right. A tire 101 is sleeved outside the wheel rim 1, a rotor 102 and a stator 201 are arranged between the left cover body 202 and the right cover body 203, the left cover body 202 and the right cover body 203 are matched to form a hub cover 2, a bearing 4 is arranged between the stator 201 and a side wall of the hub cover 2, a sealing cover plate 6 is arranged between the bearing 4 and the side wall of the hub cover 2, one side of the sealing cover plate 6 is provided with an opening, and a pressurizing circular ring 602 is arranged at the opening of the sealing cover plate 6. The left cover body 202 and the right cover body 203 are matched with each other to form the hub cover 2, which is rotatably connected with the wheel rim 1 through the bearing 4, and the wheel rim 1 and the hub cover 2 are matched through the bearing 4 to form an accommodating cavity 5. The rotor 102 and the stator 201 are both located in the accommodating cavity 5, and the sealing cover plate 6 is arranged between the bearing 4 and the side wall of the hub cover 2. A sealing member 601 at a bottom portion of the sealing cover plate 6 is sleeved on an inner ring 401 of the bearing 4, and a top end of the sealing cover plate abuts against the wheel rim 1, so that the accommodating cavity 5 is sealed to avoid a liquid from entering the accommodating cavity 5 from a gap between the hub cover 2 and the wheel rim 1 and a gap in the bearing 4 during use, thus improving the use stability.

The left cover body 202 and the right cover body 203 are both provided with a cooling groove 2041, and the left cover body 202 and the right cover body 203 are both provided with two mounting seats 2041 for connecting with the V-shaped frames 301. A water inlet pipe 2042 is arranged on a side wall of one of the mounting seats 2041 of the left cover body 202, a water outlet pipe 2043 is arranged on a side wall of one of the mounting seats 2041 of the right cover body 203, and one ends of the water inlet pipe 2042 and the water outlet pipe 2043 are respectively communicated with the cooling grooves 2041 of the left cover body 202 and the right cover body 203. The two cooling grooves 2041 are matched with each other to form a cooling channel 204, the cooling channel 204 is located right below the stator 201, and cooling water is injected into the cooling channel 204 through the water inlet pipe 2042 to circulate in the cooling channel 204 and finish one cycle inside the cooling channel, and is discharged from the water outlet pipe 2043 after heat absorption, so as to improve heat dissipation efficiency of the hub motor.

It can be understood that a sealing gasket 2044 is sandwiched between the left cover body 202 and the right cover body 203, a plurality of communication holes are arranged in the sealing gasket 2044, and the sealing gasket is used for blocking two oppositely arranged cooling grooves 2041, so as to reduce an impact of the liquid entering the cooling grooves 2041 and increase retention time of the cooling liquid in the cooling channel 204. Layouts, shapes and sizes of the cooling grooves 2041 may be consistent or different, which will not be limited in the present application.

Within a certain range, the larger the hollow size of the hub cover 2, the better the heat dissipation performance. The hollow size of the hub cover 2 may also be set according to actual needs. For example, in the embodiment of the present application, a ratio of an inner diameter to an outer diameter of the hollow size of the hub cover 2 is greater than or equal to 30%. Preferably, the ratio of the inner diameter to the outer diameter of the hollow size of the hub cover 2 is greater than or equal to 40%. In a specific example of the present application, the outer diameter of the hub cover 2 is 10 inches, which is equal to about 333.3 mm, the inner diameter of the hub cover 2 is equal to 160.0 mm, and the ratio of the inner diameter to the outer diameter of the hollow hub cover 2 is about 48.0%. In another specific example of the present application, the outer diameter of the hollow hub cover 2 is 12 inches, which is equal to 400.0 mm, the inner diameter of the hollow hub cover 2 is equal to 182.9 mm, and a ratio of the inner diameter of the hollow hub cover 2 to an outer diameter of the hub motor is about 45.7%. An inner diameter value of the hollow hub cover 2 and an outer diameter value of the hub motor may also be other values, which will not be limited in the present application.

Figure 3:
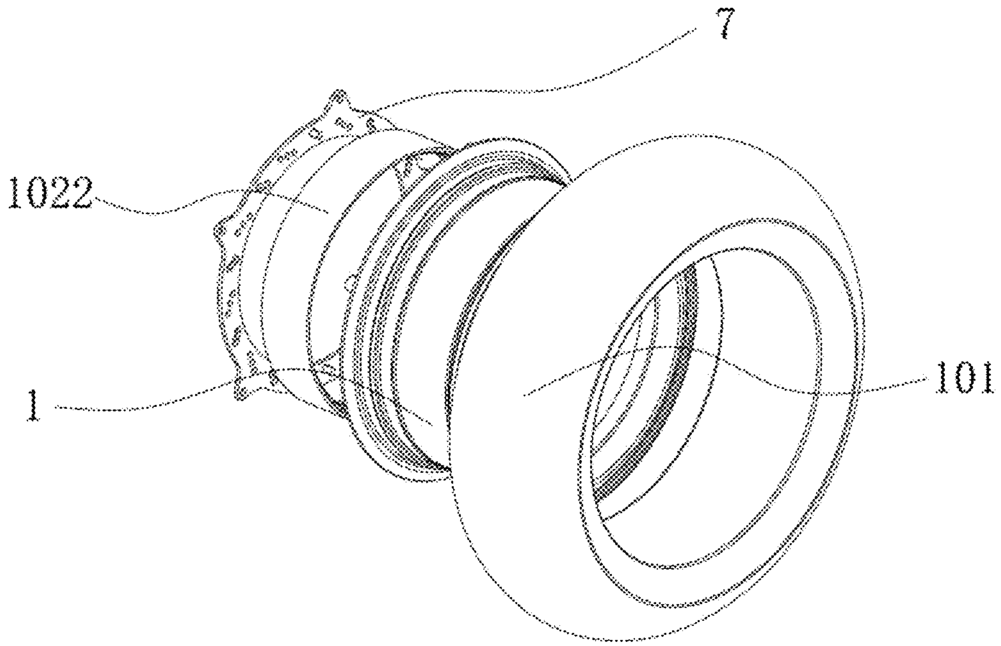
FIG. 3 is a partial exploded view of a wheel rim part of the present application.
Figure 4:
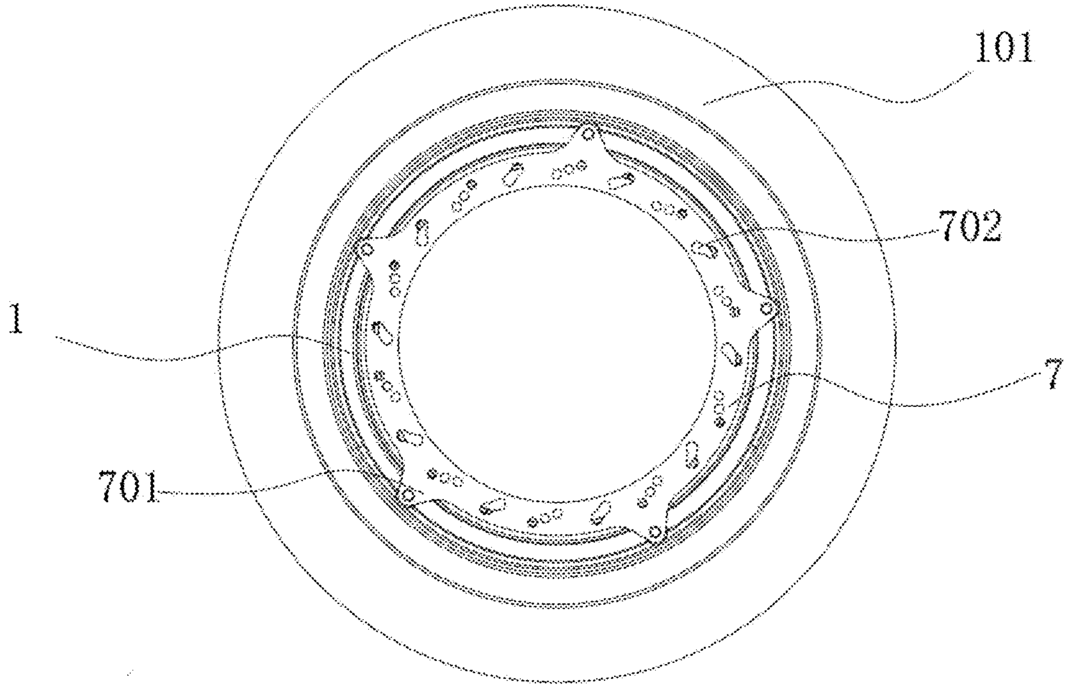
FIG. 4 is a partial front view of the wheel rim part of the present application.

As shown in FIG. 3 and FIG. 4, in the present application, a wheel rim part comprises the tire 101, the wheel rim 1 and the rotor 102. The tire 101 is located on the outermost side of the hub motor, the wheel rim 1 is used for mounting the tire 101 and the rotor 102, one side of the wheel rim 1 is provided with a brake pad 7, the brake pad 7 is annular, and a plurality of integrally formed protrusions 701 are uniformly arranged in a circumferential direction of an outer ring 402. The brake pad 7 is connected with a side wall of the wheel rim 1 through the protrusions 701, and a plurality of cooling holes 702 are uniformly arranged in a surface of the brake pad 7.

The rotor 102 is composed of multiple groups of magnetic elements 1021, the magnetic elements 1021 are connected by a magnetic mounting member 1022, the magnetic mounting member 1022 is arranged on an inner peripheral wall of the wheel rim 1, and the magnetic mounting member 1022 may be implemented as an iron ring. In a specific example of the present application, the magnetic mounting member 1022 is integrally formed on the wheel rim 1 by pouring and casting, or other methods, that is, the magnetic mounting member 1022 and the wheel rim 1 form an integrated structure. Further, the magnetic mounting member 1022 may be embedded in the wheel rim 1. In other specific examples of the present application, the magnetic mounting member 1022 and the wheel rim 1 may be in a split structure, which will not be limited in the present application.

Figure 5:
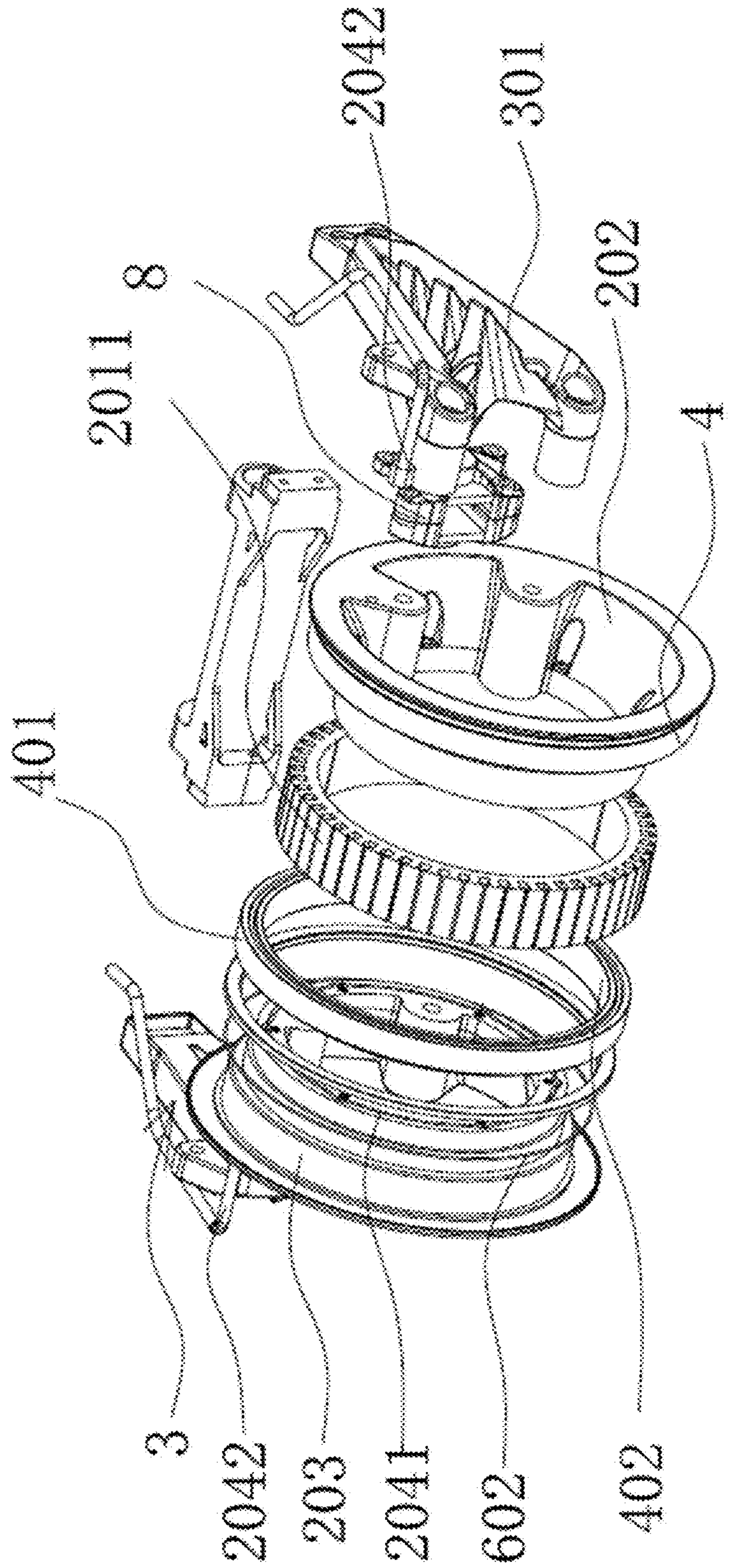
FIG. 5 is a partial exploded view of a hub cover part of the present application.
Figure 6:
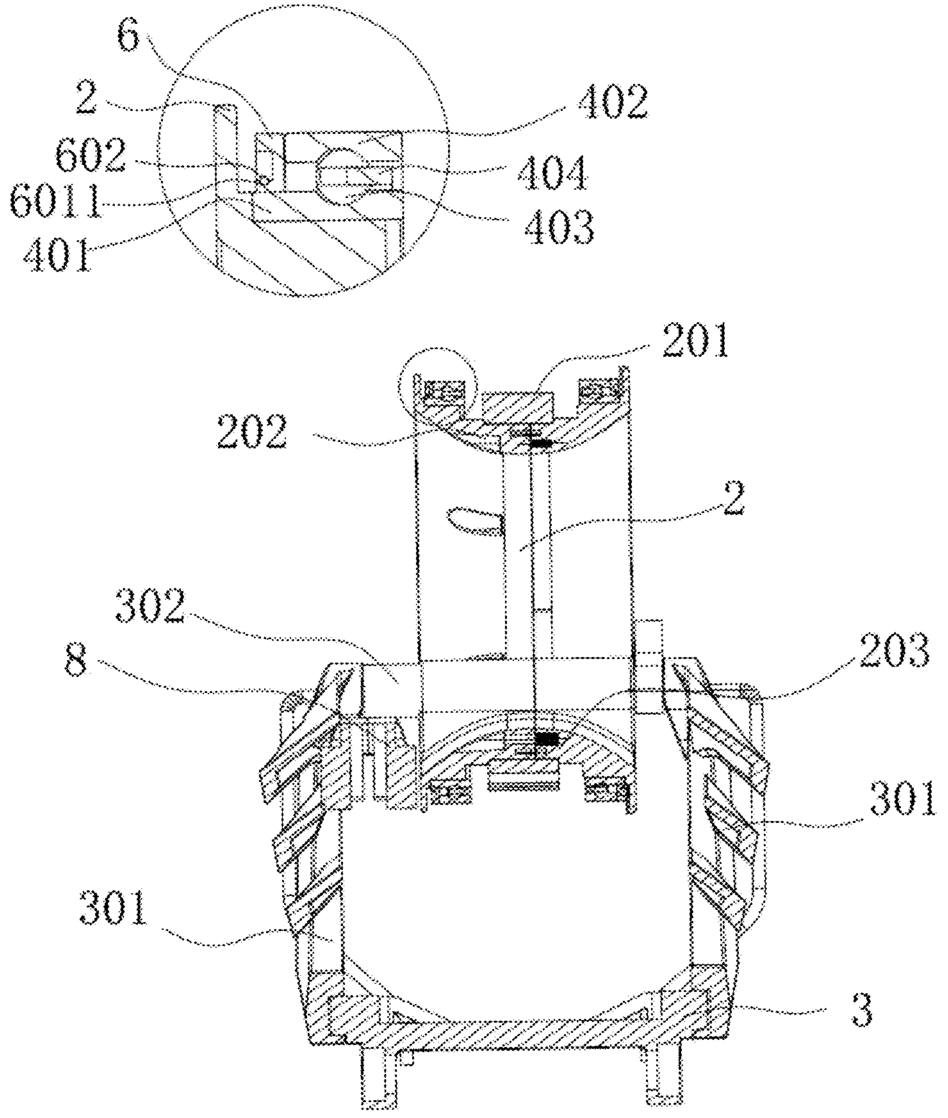
FIG. 6 is a partial sectional view of the hub cover part of the present application.

As shown in FIG. 5 and FIG. 6, in the present application, a hub part comprises the hub cover 2, the bearing 4 and the stator 201. The hub part is fixedly connected with the driven subject through the supporting frame 3, the supporting frame 3 comprises the V-shaped frames 301 located on two sides, and the hub cover 2 comprises the left cover body 202 and the right cover body 203. The left cover body 202 and the right cover body 203 are both provided with an L-shaped groove 2061, the two L-shaped grooves 2061 are matched to form an embedding groove 206, the left cover body 202 and the right cover body 203 are both provided with two mounting seats 2041, and the V-shaped frames 301, the water inlet pipe 2042 and the water outlet pipe 2043 are all fixedly connected with the mounting seats 2041. A cushion block 302 is arranged between the mounting seat 2041 and the V-shaped frame 301 for increasing a distance between the V-shaped frame 301 and the hub motor, reserving a certain space for the brake pad 7 and a brake caliper 8, and reducing the risk of interference between the V-shaped frame 301 and the hub.

In addition, a winding assembly of the stator 201 is sandwiched between the left cover body 202 and the right cover body 203 and arranged in the embedding groove 206, and the left cover body 202 and the right cover body 203 are respectively provided with the bearing 4. The sealing member 601 is sleeved on the inner ring 401 of the bearing 4, the pressurizing circular ring 602 is sleeved on the sealing member 601, and the sealing cover plate 6 is located between the side wall of the hub cover 2 and the bearing 4. The bearing 4 ensures that a rotation center of the hub part does not deviate, and the sealing cover plate 6 is arranged between the bearing 4 and a side plate of the hub cover 2, thus further avoiding the liquid from entering the accommodating cavity 5 from a gap between the outer ring 402 and a cage 404 in the bearing 4.

Figure 7:
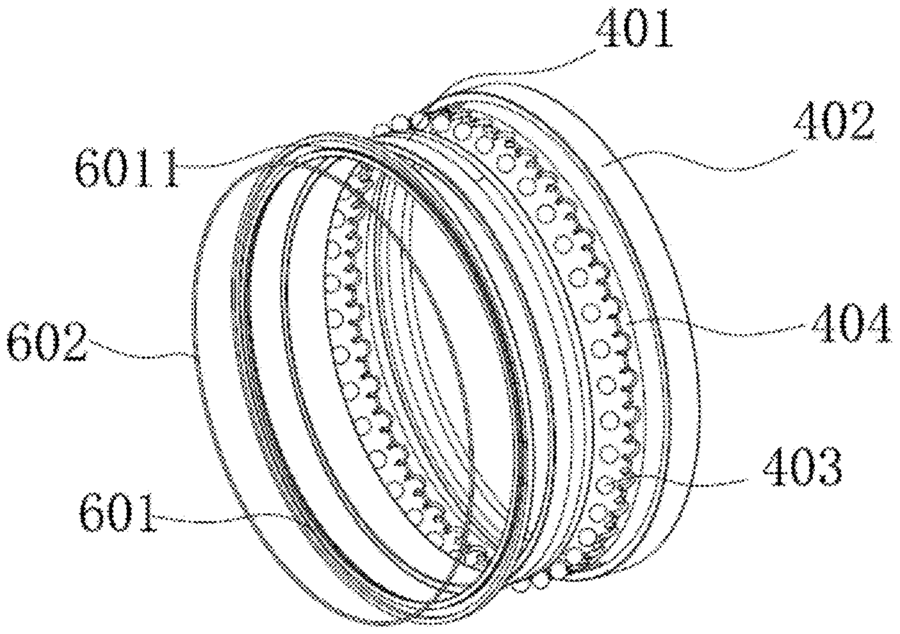
FIG. 7 is an exploded view of a bearing of the present application.
Figure 8:
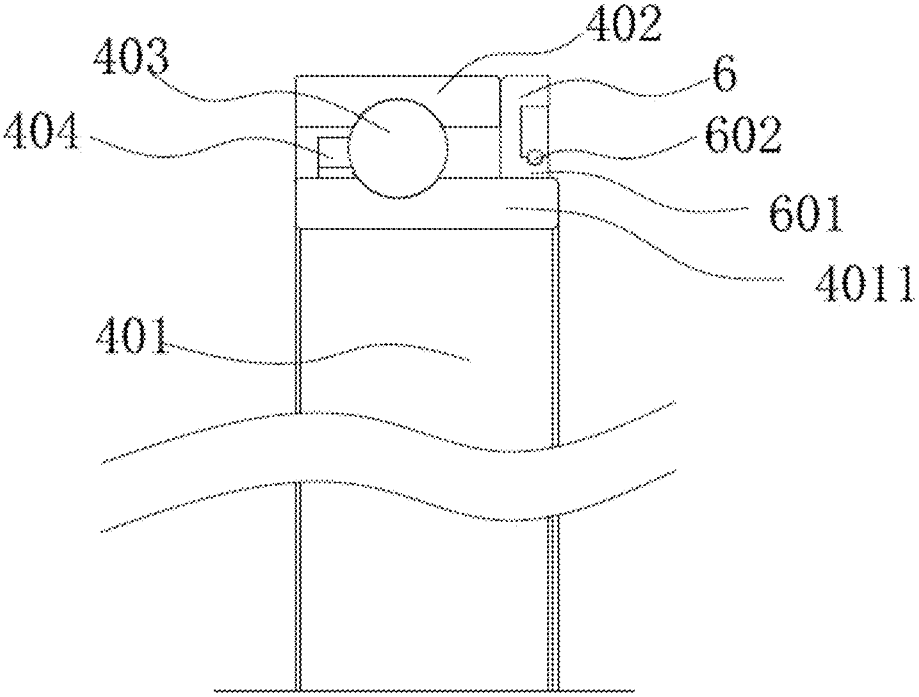
FIG. 8 is a sectional view of the bearing of the present application.
Figure 9:
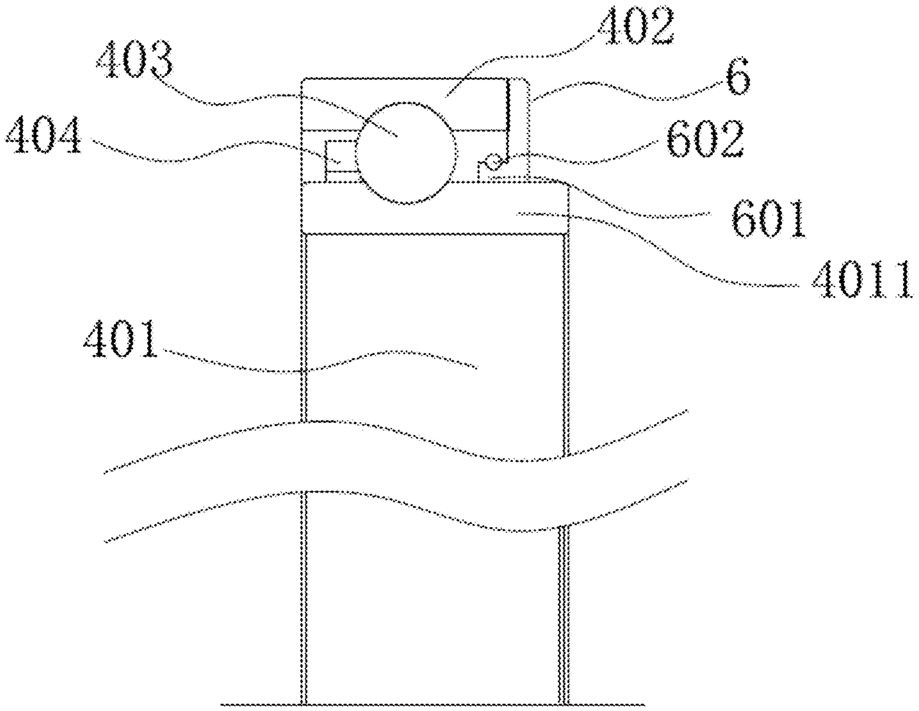
FIG. 9 is a sectional view of another embodiment of the bearing of the present application.

As shown in FIG. 7 and FIG. 8, in the present application, the bearing 4 comprises the inner ring 401, the outer ring 402 and a plurality of rolling members 403. The rolling members 403 are connected through the cage 404, one end of the inner ring 401 is flush with the outer ring 402, and the other end of the inner ring protrudes from the outer ring 402 and the cage 404 to form a supporting portion 4011. The sealing cover plate 6 is sleeved on the supporting portion 4011, the sealing cover plate 6 is C-shaped, and the sealing member 601 is arranged on a bottom portion of the sealing cover plate. A groove 6011 is arranged on the sealing member 601, the pressurizing circular ring 602 is located in the sealing member 601, and the sealing member 601 is tightly attached to the supporting portion 4011. One side of the sealing cover plate 6 oriented to the side wall of the hub cover 2 is provided with an opening, the groove 6011 is arranged on a bottom portion of the opening, and the pressurizing circular ring 602 is embedded in the groove 6011. The rolling member 403 may be made of a ceramic material or a metal material. In the embodiment of the present application, a friction coefficient of the rolling member 403 is less than or equal to 0.05, and in a specific example of the present application, the friction coefficient of the rolling member 403 is 0.001 to 0.005. As shown in FIG. 9, as another embodiment of the present application, a section of the sealing cover plate 6 may also be L-shaped, the sealing cover plate 6 is located on an outer side, and a pressurizing member is located on an inner side.

In another aspect, the hub motor increases acting points (which are namely supporting points), and is suitable to be mounted on an object to be assembled (such as a vehicle body and a robot body) through two supporting points on the V-shaped frame 301, thus playing a role in dispersing stress. For example, in a specific example of the present application, the hub motor comprises two mounting seats 2041 respectively arranged on the left cover body 202 and the right cover body 203, and is suitable to be mounted on the object to be assembled through a V-shaped supporting skeleton and two rotating shafts. Moreover, setting positions of the acting points avoid an internal structure of the hub motor, and even if the rotating shaft is worn, water will not enter the internal structure of the hub motor due to the wear of the rotating shaft.

In the present application, the rotor 102 comprises multiple groups of magnetic elements 1021, the magnetic elements 1021 are arranged on an inner wall of the magnetic mounting member 1022, and the magnetic elements 1021 correspond to the stator 201, so that after the hub motor is turned on, a cutting magnetic induction line is formed between the rotor 102 and the stator 201, thus enabling the rotor 102 to operate efficiently.

To sum up, on the basis of an original solid hub motor, the present application changes a traditional hub into the hollow hub, which reduces the weight, and meanwhile, a number of windings of the stator 201 is increased by embedding the stator 201 in the hub cover 2, so as to improve an output torque and a rotating speed of the motor, and increase a contact area between the stator 201 and air, thus improving heat dissipation efficiency of the stator 201 during use, and the cooling channel 204 composed of the cooling grooves 2041 is arranged in the hub cover 2, and the cooling liquid is injected into the cooling channel 204 through the water inlet pipe 2042, and then discharged from the water outlet pipe 2043. Because the cooling channel 204 is just below the winding assembly of the stator 201, heat is discharged in time during use. In order to avoid the liquid from entering the accommodating cavity 5, the sealing cover plate 6 is arranged between the bearing 4 and the side wall of the hub cover 2, the section of the sealing cover plate 6 is C-shaped, and the opening of the sealing cover plate 6 is oriented to the hub cover 2, so that the contact area with the liquid is increased, and the sealing performance is improved. Meanwhile, the pressurizing circular ring 602 is sleeved on the sealing member 601 on the bottom portion of the sealing cover plate 6, and the sealing member 601 is tightly attached to the supporting portion 4011 extending from the inner ring 401 through the pressurizing circular ring 602, so as to avoid the displacement of the sealing cover plate 6 and improve the reliability of the hub during use, and the groove 6011 is arranged on the sealing member 601, so as to avoid the displacement of the pressurizing circular ring 602.

The specific embodiments described herein are only illustrative to the spirit of the present application. Those skilled in the technical field to which the present application belongs may make various modifications or supplements to the specific embodiments described or make substitutions in a similar way, without departing from the spirit of the present application or exceeding the scope defined by the appended claims.

Although the terms 1: wheel rim; 101: tire; 102: rotor; 1021: magnetic element; 1022: magnetic mounting member; 2: hub cover; 201: stator; 2011: winding bracket; 202: left cover body; 203: right cover body; 204: cooling channel; 2041: cooling groove; 2042: water inlet pipe; 2043: water outlet pipe; 2044: sealing gasket; 205: mounting seat; 206: embedding groove; 2061: L-shaped groove; 3: supporting frame; 301: V-shaped frame; 302: cushion block; 4: bearing; 401: inner ring; 4011: supporting portion; 402: outer ring; 403: rolling member; 404: cage; 5: accommodating cavity; 6: sealing cover plate; 601: sealing member; 6011: groove; 602: pressurizing circular ring; 7: brake pad; and 8: brake caliper in the drawings are frequently used herein, the possibility of using other terms is not excluded. These terms are only used to describe and explain the essence of the present application more conveniently; and the explanation of the terms as any additional restrictions is against the spirit of the present application.

What is claimed is:

1. A hollow hub motor, comprising a wheel rim for mounting a tire and a hollow hub cover, a supporting frame being connected to an outer edge of a side wall of the hub cover, the supporting frame being used for connecting the hub motor and a driving subject, a bearing being rotatably connected between the hub cover and the wheel rim, and the bearing comprising an outer ring and an inner ring matched with the hub cover, one side of the inner ring is flush with the outer ring, wherein the wheel rim and the hub cover are matched to form an accommodating cavity, a stator and a rotor are oppositely arranged in the accommodating cavity, the stator is fixed on the hub cover, a sealing cover plate is arranged between the bearing and the side wall of the hub cover, a sealing member is fixedly connected to the sealing cover plate, the other side of the above inner ring extends towards the side wall of the hub cover to form the supporting portion, and the supporting portion is used for mounting the sealing cover plate, the sealing member is sleeved on a supporting portion on the inner ring and tightly attached to the supporting portion to realize sealing, and the sealing cover plate is arranged on one side of the bearing, so that the stator and the rotor are isolated from the outside.

2. The hollow hub motor according to claim 1, wherein a section of the sealing cover plate is L-shaped or C-shaped, a pressurizing circular ring is sleeved on the sealing member, and the sealing member is tightly attached to the supporting portion through the pressurizing circular ring.

3. The hollow hub motor according to claim 2, wherein an opening of the L-shaped or C-shaped sealing cover plate is oriented to the side wall of the hub cover.

4. The hollow hub motor according to claim 2, wherein a groove is formed in an upper surface of the sealing member, and the pressurizing circular ring is embedded in the groove.

5. The hollow hub motor according to claim 2, wherein the bearing further comprises an outer ring and a rolling member, the outer ring is matched with an inner side of the wheel rim, the rolling member is sandwiched between the outer ring and the inner ring, and the sealing cover plate covers one sides of the outer ring and the rolling member, and is matched with the outer side of the hub cover and the inner side of the wheel rim to form the closed accommodating cavity.

6. The hollow hub motor according to claim 5, wherein a plurality of rolling members are sandwiched between the outer ring and the inner ring, the rolling members are connected through a cage, and the rolling member is made of metal or ceramic.

7. The hollow hub motor according to claim 6, wherein two bearings are provided and symmetrically arranged on two sides of the hub cover.

8. The hollow hub motor according to claim 1, wherein a cooling channel is arranged in the hub cover, the stator comprises a winding bracket, and the cooling channel is located right below the winding bracket.

9. The hollow hub motor according to claim 8, wherein a water inlet pipe and a water outlet pipe are also fixed on the hub cover, the water inlet pipe is used for introducing a liquid into the cooling channel for cooling, and the water outlet pipe is used for discharging the liquid after cooling from the cooling channel.

10. The hollow hub motor according to claim 9, wherein the hub cover comprises a left cover body and a right cover body, one sides of the left cover body and the right cover body are respectively provided with a cooling groove, the two cooling grooves are oppositely arranged and matched to form the cooling channel, and the two cooling grooves are respectively communicated with the water inlet pipe and the water outlet pipe.

11. The hollow hub motor according to claim 10, wherein a sealing gasket is arranged between the left cover body and the right cover body, the sealing gasket is used for blocking a liquid in the cooling groove, and a plurality of communication holes are arranged in the sealing gasket.

12. The hollow hub motor according to claim 10, wherein the supporting frame comprises two symmetrically arranged V-shaped frames, the left cover body and the right cover body are both provided with two mounting seats, and the two mounting seats are used for fixing one ends of the V-shaped frames.

13. The hollow hub motor according to claim 12, wherein a cushion block is arranged between the hub cover and the V-shaped frame, and the cushion block is used for connecting the V-shaped frame and the hub cover.

14. The hollow hub motor according to claim 12, wherein the water inlet pipe is located on a side wall of one of the mounting seats of the left cover body, and the water outlet pipe is located on a side wall of one of the mounting seats of the right cover body.

15. The hollow hub motor according to claim 12, wherein one side of the wheel rim is provided with a brake ring, a brake caliper is fixed on one of the V-shaped frames, the brake caliper is located between the V-shaped frame and the side wall of the hub cover, and a brake assembly is matched with the brake ring.

16. The hollow hub motor according to claim 1, wherein the rotor comprises a magnetic mounting member and multiple groups of magnetic elements, the magnetic element is arranged on the inner side of the wheel rim through the magnetic mounting member, and the rotor and the stator are oppositely arranged.

17. The hollow hub motor according to claim 10, wherein an embedding groove for mounting the winding bracket is arranged in the hub cover, and the embedding groove is formed by matching the left cover body with the right cover body.

18. The hollow hub motor according to claim 1, wherein a ratio of an inner diameter to an outer diameter of the hollow hub cover is greater than or equal to 30%.

* * * * *